United States Patent [19]
Thigpen

[11] 3,825,886
[45] July 23, 1974

[54] TOWABLE SEISMIC DETECTOR CONVEYANCE

[75] Inventor: Ben B. Thigpen, Houston, Tex.

[73] Assignee: Western Geophysical Company of America, Houston, Tex.

[22] Filed: May 3, 1971

[21] Appl. No.: 139,426

[52] U.S. Cl. .................... 340/3 T, 340/7 R, 340/17
[51] Int. Cl. ............................................. G01s 9/66
[58] Field of Search ..... 181/.5 VM, .5 EC; 340/3 T, 340/7, 9, 14, 15, 17

[56] References Cited
UNITED STATES PATENTS

| | | | |
|---|---|---|---|
| 1,584,613 | 5/1926 | Comstock et al. | 340/3 T |
| 2,649,579 | 8/1953 | Alexander | 340/17 |
| 2,738,488 | 3/1956 | MacKnight | 340/7 R |
| 2,755,879 | 7/1956 | Widess | 181/.5 EC |
| 2,807,793 | 9/1957 | Bayhi | 340/17 |
| 3,275,097 | 9/1966 | Pavey, Jr. | 340/7 R |
| 3,301,345 | 1/1967 | Carder | 181/.5 VM |
| 3,306,391 | 2/1967 | Bays | 181/.5 VM |
| 3,435,410 | 3/1969 | Babb | 340/7 |

FOREIGN PATENTS OR APPLICATIONS 826,932   1/1960   Great Britain.................. 181/.5 VM

*Primary Examiner*—Maynard R. Wilbur
*Assistant Examiner*—G. E. Montone
*Attorney, Agent, or Firm*—Michael P. Breston

[57] ABSTRACT

Seismic exploration is conducted by towing a conveyance over the earth's surface. The conveyance includes a flexible support member, such as a thin, elongated flexible belt, carrying a plurality of seismic detectors which are suitably spaced apart. A signal channel interconnects the detectors with a signal utilization device. The belt extends sufficiently in a lateral direction to prevent the belt from rotating or twisting during tow about its longitudinal axis. Proper seismic coupling between the detectors and ground is achieved. If necessary the detectors can be acoustically isolated from the belt.

3 Claims, 13 Drawing Figures

PATENTED JUL 23 1974 3,825,886
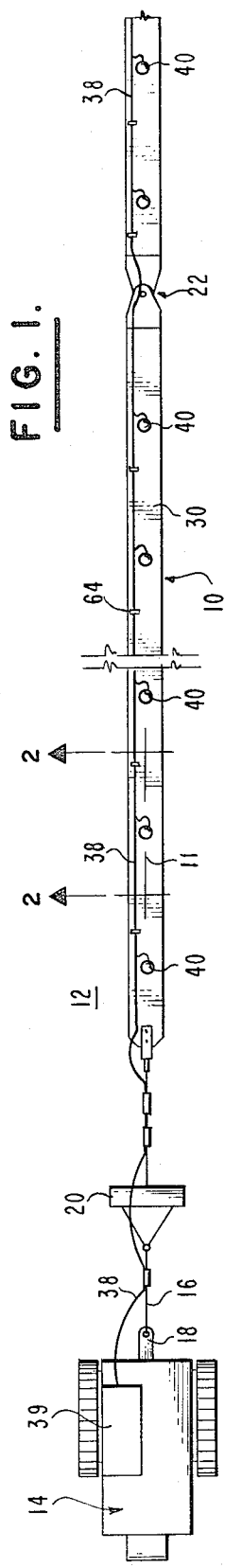
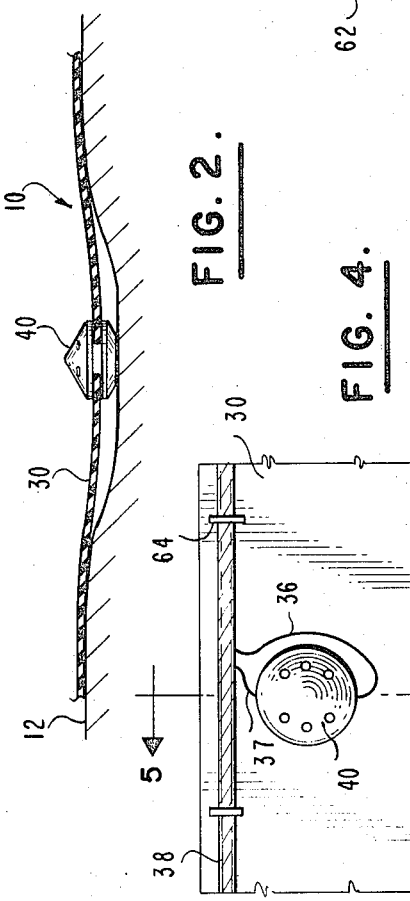
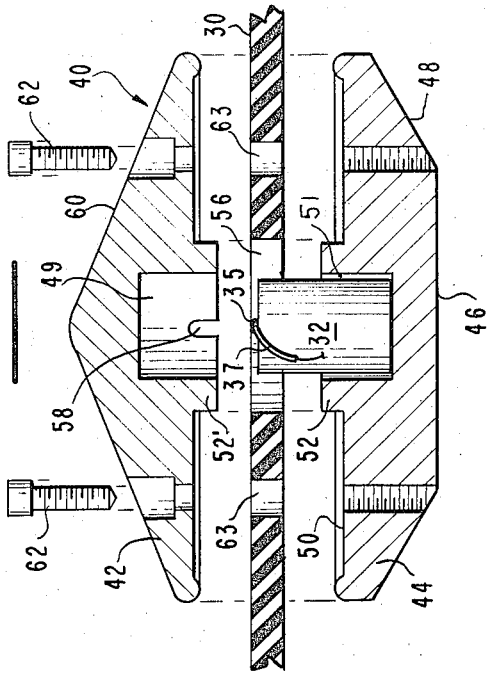
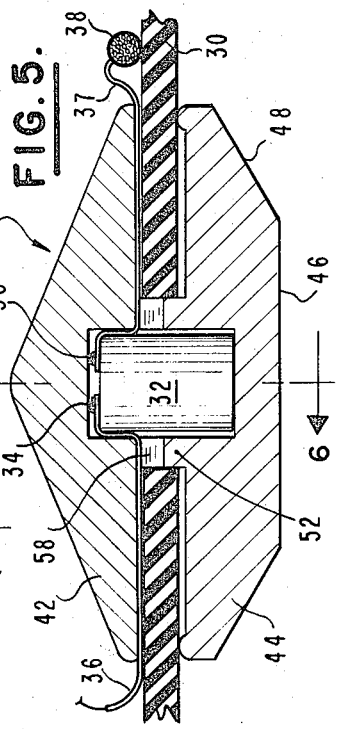
INVENTOR.
BEN B. THIGPEN,
BY
MICHAEL P. BRESTON
ATTORNEY.

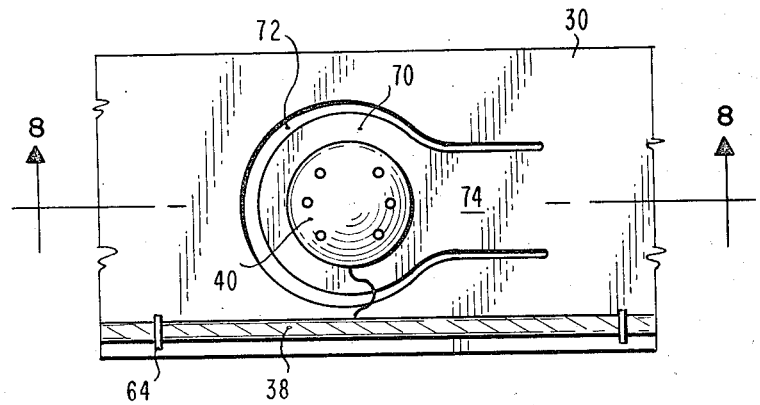
FIG. 7.
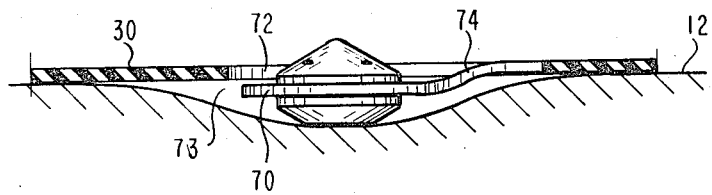
FIG. 8.
FIG. 10.
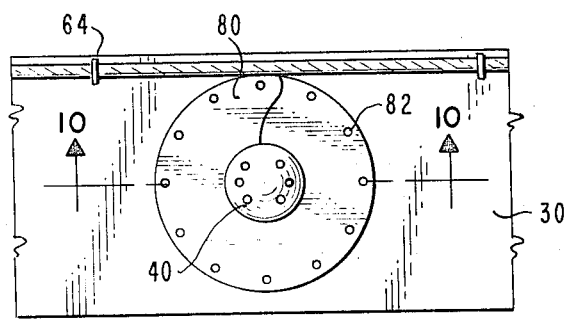
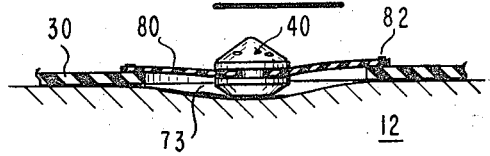
FIG. 12.
FIG. 9.
FIG. 13.
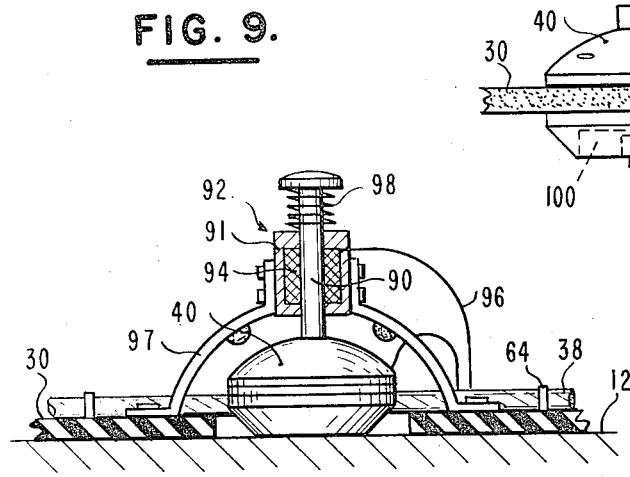
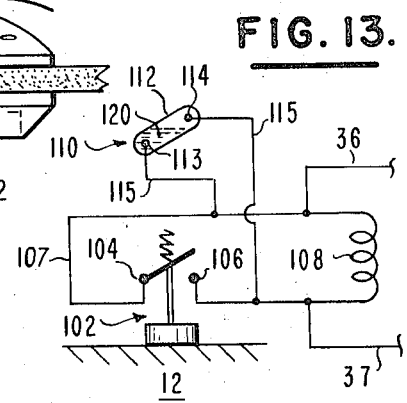
FIG. 11.
INVENTOR.
BEN B. THIGPEN,
BY
MICHAEL P. BRESTON,
ATTORNEY

TOWABLE SEISMIC DETECTOR CONVEYANCE

BACKGROUND OF THE INVENTION

1. Field of the Invention

This invention generally relates to land seismic exploration in which arrays of seismic detectors are towed over the earth's surface. The earth may be covered with ice, snow, gravel, sand, brush, water, etc.

2. Description of the Prior Art

In land seismographic exploration, arrays of detectors are seismically coupled to the ground for detecting man-made or natural seismic signals in the ground.

In a typical prior art method, acoustic waves are generated on the surface of the earth which travel downwardly through the earth's layers. The reflected seismic signals from the under surface layers are detected by seismic detector arrays. The detected signals are channeled to a signal utilization device such as a recorder. The detector arrays are moved manually from seismic station to station. At each station acoustic waves are generated and reflected seismic waves recorded.

Attempts have been made to develop mechanical detector conveyances. One such mechanical detector conveyance is described in copending patent application, Ser. No. 23,914, assigned to the same assignee. With such towable detector conveyances, as described in said copending patent application, integrated systems of signal recording and detector-conveying equipment eliminate the need for direct manual labor. Of course, skilled technicians are still required to set up and maintain such integrated systems.

The need for integrated systems is apparent when it is considered that the manual handling of seismic detectors does not contribute to the value of the seismic exploration method, and that the moving and positioning of the seismic detectors is expensive. In addition to the cost of detector handling while carrying out seismic exploration, indirect costs are also substantial. One such indirect cost is the cost of the encountered delays when moving from seismic station to station.

Accordingly, it is a prime objective of this invention to lower considerably the cost of land seismic exploration, to eliminate the need for manual handling and conveying of detector arrays, to considerably reduce exploration time per unit of area, to limit human fatique and prevent injuries, and to allow for integrated detector conveying and seismic signal processing operations.

SUMMARY OF THE INVENTION

In its broader aspect, the present invention contemplates the provision of a seismic detector conveyance which will not overturn during tow over extended land surfaces which may be covered with sand, ice, snow, gravel, water, etc. The conveyance includes an elongated, flexible support member carrying a plurality of seismic detectors. Each detector is adapted for seismic coupling with the earth's surface.

In specific aspects of the invention, the flexible member is an elongated belt which has a width sufficient to prevent the belt from rotating or twisting during tow about its longitudinal axis. Each detector can be housed in a casing having a base with a configuration such as to facilitate the movement of the case over the earth's surface. If necessary or desirable, each detector casing can be acoustically isolated from the belt. Means can be provided to detect the proper seismic coupling between the detector and the earth and to automatically block the detector's output should improper seismic coupling occur. The carrier towing the seismic conveyance can be provided with surface-conditioning means to clear a path for the detector conveyance. Various beltings can be employed such as are used, for example, in mechanical conveyer handling equipment.

BRIEF DESCRIPTION OF THE DRAWINGS

FIG. 1 is a schematic representation of a seismic detector conveyance towed by a prime mover;

FIG. 2 is a sectional view on line 2—2 in FIG. 1 illustrating the coupling between a detector and the underlying ground;

FIG. 3 illustrates the manner of coupling two adjacent detector conveyances;

FIG. 4 is an enlarged top view of a portion of the conveyance shown in FIG. 1;

FIGS. 5 and 6 are sectional views on lines 5—5 and 6—6 in FIGS. 4 and 5 respectively;

FIG. 7 is a top view of the conveyance with the detector mounted in a flap;

FIG. 8 is a sectional view on line 8—8 in FIG. 7;

FIG. 9 is a top view of a portion of the conveyance illustrating the manner of mounting the detector in a flexible disc;

FIG. 10 is a sectional view on line 10—10 in FIG. 9;

FIG. 11 illustrates the manner of mounting the detector for remote coupling control by a solenoid-operated actuator;

FIG. 12 illustrates typical means which could be employed for monitoring the coupling and orientation of the detector's casing; and FIG. 13 is a diagrammatic representation of the electrical circuit used in FIG. 12.

In the drawings the same reference characters designate similar parts. A seismic conveyance generally designated as 10 is towed over the earth's surface 12 by a suitable prime mover 14 through a two line 16 attached to a hitch 18. A suitable surface conditioning means 20 such as a drag, may be employed to clear a path for the oncoming conveyance 10.

Since in practice conveyance 10 must be very long, say on the order of several thousand feet, it can conveniently be formed from individual conveyance sections 21 (FIG. 3). Sections 21 are coupled together by suitable coupling means 22. Of course the conveyance need not be sectionalized and may be continuous. Also, with the use of coupling means 22, should a portion of the conveyance 10 be ruptured, repair in the field may be easily accomplished.

In a preferred embodiment, the conveyance 10 is made of a substantially flat flexible member which is relatively thin and which extends sufficiently in a lateral extent to prevent the flexible member from rotating or twisting about its longitudinal axis 11. A material which is especially suitable for the flexible conveyer member is a belt 30. Belt 30 can be made of fabric, rubber, plastic, leather and combinations thereof. Conveyer belting material is suitable. Typically such belts are composed of plies of cotton duck impregnated with a slow-aging rubber compound. Belt 30 can be composed of belt sections 21 having their adjacent ends joined together either by cementing or connected together by the coupling means 22 (FIG. 3).

Belt 30 is not limited to any particular flexible material as long as it is sufficiently flexible, substantially flat, and strong to withstand the environmental conditions including temperature, and the abrasiveness of the earth's top layer.

The main function of belt 30 is to serve as a towable mechanical conveyance of suitably spaced-apart detectors 32 (FIG. 5) thereby eliminating the need for direct manual labor and the human error in spacing the detectors. The seismic detectors 32 housed in or carried by belt 30 can be of any conventional design. Land seismic detectors are commonly referred to as geophones. Each geophone includes a coil assembly (not shown) movable relative to a magnetic structure supported by a geophone casing. The movement of the coil assembly generates electric signals across the geophone's output terminals 34, 35. Terminals 34, 35 are electrically coupled by wires 36, 37, respectively, to a signal channel, such as a multi-conductor cable 38. Cable 38 channels the output signals from all of the geophones 32 to a utilization device 39 which typically includes a seismographic recorder.

Geophones 32 are typically grouped in detector arrays in conventional manner. A detector array can extend over a portion or an entire cable section 21. On the other hand a detector array can extend over two or more such sections as will be apparent to those skilled in the art. Thus, for simplicity of the drawings, each geophone 32 actually represents a cluster of geophones forming a detector array. The formation of each array and the type of detectors employed will depend on the preferred seismic exploration technique, for example, single-fold reflection, common-depth-point reflection, refraction profiling, etc. All these techniques are well known in the art. Accordingly, the term "land seismic prospecting" or its equivalent whenever used in this specification covers all such known land seismic prospecting techniques. Also, the term "seismic detector" is not limited to any particular detector and may include detectors of the dynamic, variable-reluctance, solid state, pressure-responsive, etc., type. All such detectors being adapted to convert seismic energy into electrical energy when the detectors are seismically coupled to the ground 12. The generated electrical energy is typically amplified, recorded, combined and corrected as may be necessary or desirable by the utilization device 39.

An important advantage of this invention is derived from the fact that flat belt 30 allows the use of relatively inexpensive "vertical" geophones which are adapted to vibrate along an axis perpendicular to the earth's surface that is an axis perpendicular to the directon of tow.

To provide good seismic coupling between each geophone 32 and ground 12, the geophone is snugly fitted inside a housing, generally designated as 40, having an upper half section 42 and a lower half section 44.

The lower half section 44 has an outer surface defining a flat central circular area 46, and an upwardly extending curved surface 48. The flat surface 46 is designed to provide optimum seismic coupling between housing 40 and ground 12. The curved surface 48 is designed to allow housing 40 to ride smoothly even over an irregular land surface without snagging. Extending from the upper surface 50 of the lower-half section 44 is a cylindrical cavity 51 having an outwardly projecting annular shoulder 52. Cavity 51 has a mating opposite cavity 49 in the upper-half housing 42 and shoulder 52 has a mating shoulder 52'. The height of each of shoulders 52 and 52' is substantially equal to one-half the thickness of belt 30 to allow the belt to become sandwiched between the two half-housings 42 and 44. The inner diameters of cavities 49 and 51 are slightly larger than the outer diameter of the geophone's casing to allow a close fit between the geophone and housing 40. The outer diameter of shoulders 52, 52' is slightly smaller than the inner diameter of a perforation 56 (FIG. 6) in belt 30.

A diametrically extending groove 58 in shoulder 52 allows terminal wires 36, 37 to extend therethrough.

The upper-half housing 42 has an aerodynamically shaped surface 60 to minimize wind resistance and hence wind-generated noise in the geophone. A plurality of bolts 62, symmetrically positioned around a circumference, extend vertically downwardly through a plurality of correspondingly positioned bores 63 in the belt 30. Thus the bolts 62 detachably clamp the two half-housings 42, 44 together and to the belt 30.

The multi-conductor cable 38 is stapled to the upper surface of belt 30 by suitable staples 64. Cable 38 can of course be molded within the belting material, if desired. Cable 38 is typically formed of sections which are suitably interconnected by multi-conductor plugs (not shown) well known in the art.

In practicing the seismographic method of this invention, after the sections 21 are coupled together to form a continuous belt 30 and the multi-conductor cable sections are also interconnected, the belt 30 is ready to be towed by the prime mover 14. In areas having very irregular terrain, it is advantageous to employ the surface-conditioning means 20 which will even out some of the irregularities. The center of gravity of the belt's mass is very close to the earth's surface. Accordingly, housing 40 is maintained in good seismic coupling with the earth. Additionally, if necessary, the lower-half housing 44 can be weighted to ensure maximum coupling with the ground. Also, since the belt 30 is flat and flexible, it resists any tendency of the belt to twist relative to the longitudinal axis 11. The dynamic shaping of housing 40 assures that it will not snag against objects extending from the earth's surface.

After belt 30 is towed to a desired seismic station, a shot hole is drilled in the ground and a suitable seismic charge placed therein. The charge is detonated to produce a downwardly directed seismic wave whose reflections from the underlying layers of the earth are detected by detectors 32. Each pair of conductors in the multi-conductor cable 38 may be connected to a separate channel in the recorder of utilization device 39 to obtain a seismic signal or trace.

After recording of the seismic signal, another shot hole is drilled forward of the previous shot hole with the prime mover 14 moving the conveyance 10 to a new location for detecting another seismic signal.

It will be appreciated that seismic energy need not be derived from an explosion but can be obtained from a gas-operated surface energy source or any other source. For an integrated system, the energy source may be mounted on the prime mover 14 which may be a wheel-mounted or track-mounted vehicle.

Under certain operating and/or environmental conditions, the vibrations of belt 30 can be undesirably transferred to the detector's housing 40. In FIGS. 7 and 8 each housing 40 is mounted on a tongue or flap 70 which is cut out from the belting material, as shown at 72. When the flap 70 extends over a depression 73 in the ground, it will be free to fall inside the depression to allow the geophone housing 40 to seismically couple with the ground. The flap 70 acoustically isolates the geophone's housing 40 from the remainder of the belt since the cut-out portion 72 limits contact with the belt itself to a relatively narrow strip 74.

In FIGS. 9 and 10 the geophone housing 40 is shown mounted on a flexible diaphragm 80 in a manner similar to the mounting of the housing 40 to the belting 30. The diaphragm 80 itself is secured to the belting by any suitable means, as by bolts 82. In practice, the relatively flexible diaphragm 80 will absorb the vibratory energy which may exist in the belting 30, thereby freeing the geophone's housing 40 from extraneous vibrations. Diaphragm 80 also allows the housing 40 to move vertically up or down relative to the lateral plane of belting 30 thereby improving the seismic coupling between housing 40 and the underlying ground.

In the embodiment shown in FIG. 11, the detector's housing 40 is mounted at the bottom end of an armature 90 forming part of a solenoid 92 whose coil 94 can be energized by a pair of wires 96 extending from the multi-conductor cable 38. Solenoid 92 is supported by a structure 97 on which is also mounted a spring 98 for normally maintaining the housing 40 in an up position. By energizing coil 94, the armature 90 is caused to move downwardly to thereby establish firm coupling between housing 40 and ground. Since coupling between armature 90 and the casing 91 of solenoid 92 is relatively loose, any existing vibrations in the belting 30 will be greatly attenuated from the housing 40.

An additional advantage obtained from the embodiment shown in FIG. 11 is that the coupling of the detector with the underlying ground can be remotely controlled and the force of such coupling readily varied.

In arctic regions where the ground is frozen or covered with snow and ice, housing 40 may be provided with a small electric heater 100 (FIG. 12) energized by power derived from the multi-conductor cable 38. To achieve maximum coupling, the casing 40 is "welded" to the snow or ice by melting some of the immediately adjacent ice surface. After the heater is de-energized and sufficiently cooled down, the melted snow refreezes to weld the housing 40 to the ground.

The output of the detectors in each array are typically combined together. If in the combination there is included the output of a geophone whose housing is improperly coupled to the ground, the entire output from the array may be significantly degraded especially if several improperly coupled housings occur within a single array. To detect whether the housing 40 is contacting the ground, there may be provided a contact switch 102 which has normally closed terminals 104 and 106 (FIGS. 12 and 13). Upon contacting ground, contact switch 102 opens terminals 104, 106 thereby removing the short circuit 107 from the geophone's coil 108. Thus, when housing 40 is properly coupled to the ground, the signal induced in coil 108 will be transmitted to the geophone's output leads 36, 37.

Housing 40 may also be provided with a tilt switch 110 which may be a mercury switch 112 having normally open terminals 113, 114. Open terminals 113 and 114 break the short circuit 115 across coil 108. If housing 40 tilts relative to the vertical 116 by an angle which exceeds the allowed tilt angle for the particular geophone employed, the mercury pool 120 will cause terminals 113 and 114 to close thereby short circuiting coil 108 and preventing coil 108 from contributing an output signal to its output leads 36, 37.

As will be apparent from the foregoing description, the present invention eliminates most of the manual handling of the detectors from land seismographic exploration and mechanically allows the detectors to become conveyed while maintaining their desired interdector spacings for optimum detector array output. The use of a flexible member, such as belting, as a detector conveyance constrains the geophones to remain in their preferred orientation with respect to the vertical, both during tow and when positioned for seismic detection. With this invention, the need for relatively expensive, gimbal-mounted detectors, such as were required by the prior art, is eliminated.

Moreover, the weighting of the belt itself adds further coupling power to the geophone's housing 40, while the low surface relief of the belting considerably reduces extraneous noises, such as have been experienced by prior art detector conveyances which were deleteriously affected by wind noise and fluttering of the detector drag member.

While this invention has been described in connection with specific embodiments thereof, it will be apparent that various modifications will readily occur to those skilled in the art and it is desired to cover all such modifications as falling within the scope of the claims attached hereto.

What is claimed is:

1. A towable seismic detector conveyance comprising:
   a substantially flat, long, flexible support belt, said belt having a substantially uniform width throughout its length, and the width dimension of said belt being considerably greater than the thickness dimension of said belt to prevent any portion of said belt from overturning when said belt is being dragged over extended surfaces of the earth;
   a multi-conductor cable longitudinally mounted on said support belt;
   a plurality of longitudinally spaced apart seismic detectors carried by said belt, said detectors being grouped into seismic detector arrays, each detector having a seismic signal sensing means;
   each detector having a housing adapted to couple the detector with the earth's surface during tow, said housing including switch means adapted to enable the signal sensing means when said housing is properly engaged with the earth's surface;
   means for electrically connecting each detector array to a pair of conductors in said cable; and
   said cable being adapted for connection to a multichannel seismic signal utilization device.

2. The conveyance of claim 1 wherein,
   each housing comprises two half-housings which are respectively attached to the top and bottom faces of said flap.

3. A towable seismic detector conveyance comprising:
   a substantially flat, long, flexible support belt, said belt having a substantially uniform width throughout its length, and the width dimension of said belt being considerably greater than the thickness dimension of said belt to prevent any portion of said belt from overturning when said belt is being dragged over extended surfaces of the earth;

a multi-conductor cable longitudinally mounted on said support belt;

a plurality of longitudinally spaced apart seismic detectors carried by said belt, said detectors being grouped into seismic detector arrays;

each detector having a housing adapted to couple the detector with the earth's surface during tow;

a heater in said housing to controllably weld and unweld said housing to and from frozen ground;

means for electrically connecting each detector array to a pair of conductors in said cable; and said cable being adapted for connection to a multi-channel seismic signal utilization device.

* * * * *